J. S. STRAWN & R. W. DAVIES.
WHEEL.
APPLICATION FILED JAN. 15, 1908.
920,685.
Patented May 4, 1909.
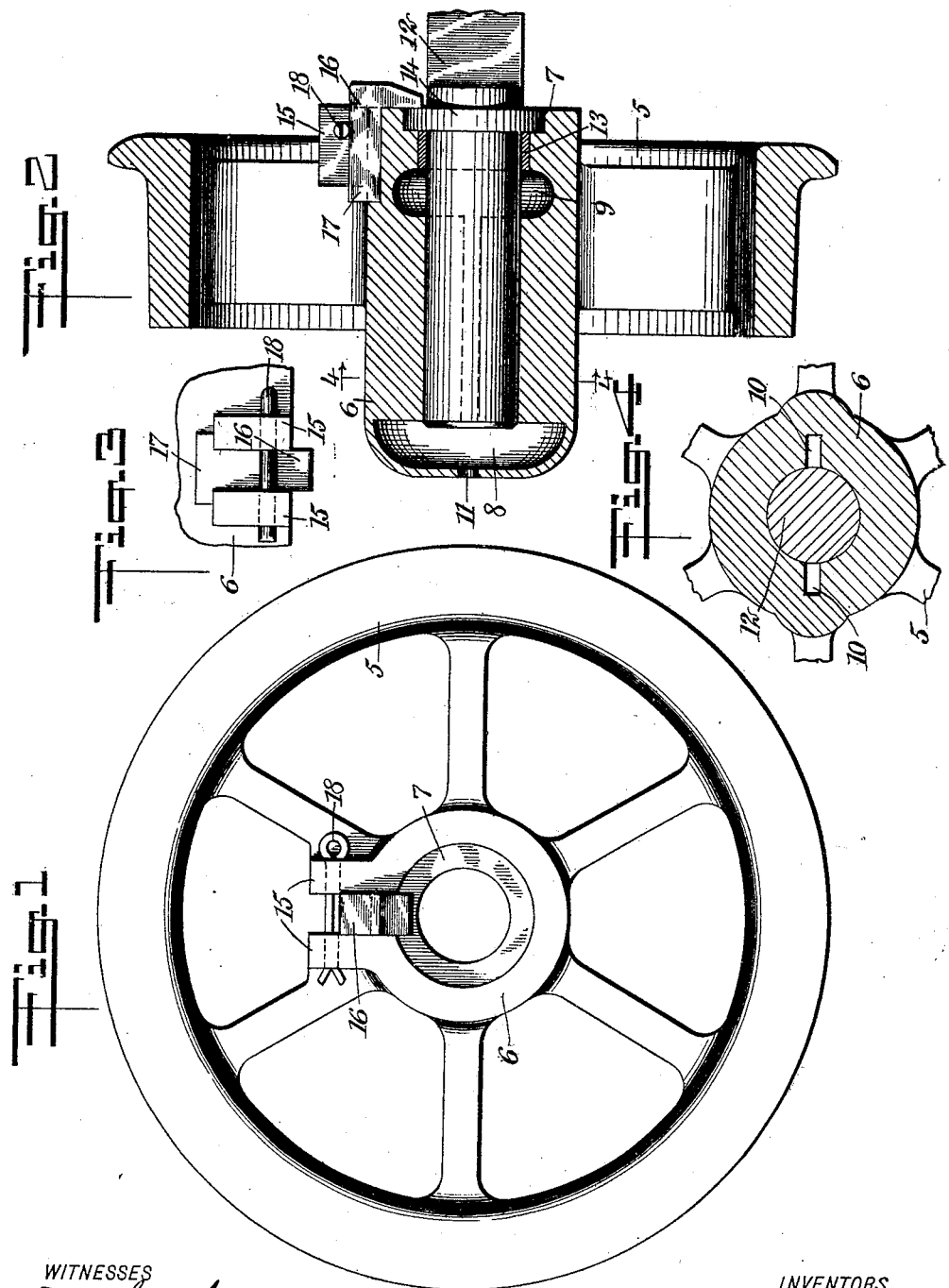
WITNESSES
INVENTORS
Jacob S. Strawn
Roderick W. Davies
BY
ATTORNEYS

UNITED STATES PATENT OFFICE.

JACOB S. STRAWN AND RODERICK W. DAVIES, OF AVONMORE, PENNSYLVANIA.

WHEEL.

No. 920,685.  Specification of Letters Patent.  Patented May 4, 1909.

Application filed January 15, 1908. Serial No. 410,977.

*To all whom it may concern:*

Be it known that we, JACOB S. STRAWN and RODERICK W. DAVIES, citizens of the United States, and residents of Avonmore, in the county of Westmoreland and State of Pennsylvania, have invented a new and Improved Wheel, of which the following is a full, clear, and exact description.

This invention is an improvement in wheels, relating primarily to a novel form of hub for insuring perfect and economical lubrication, and has for an object the provision of a hub constructed with a counterbore, a lubricating chamber, an annular lubricating chamber connected with the lubricating chamber by a passage, a hardened bushing arranged between the annular chamber and the counterbore, and a latch for engaging over the collared or enlarged portion of the axle located in the counterbore, holding the axle against longitudinal movement, the counterbore being at the inner end of the hub, the lubricating chamber at the outer end thereof, and the annular lubricating chamber occupying an intermediate position, and itself and passage arranged contiguous to the bore of the hub.

Reference is to be had to the accompanying drawings forming a part of this specification, in which similar characters of reference indicate corresponding parts in all the views.

Figure 1 is an inner face view of a wheel embodying our improvements; Fig. 2 is a central section of the same; Fig. 3 is a fragmentary plan of the hub around the latch; and Fig. 4 is a cross-section through the hub substantially on the line 4—4 of Fig. 2, looking in the direction of the arrows.

We have shown our improvements applied to a wheel 5, as used on mining cars and comprising the hub 6 having the counterbored portion 7, the lubricating chamber 8, and the annular lubricating chamber 9 connecting with the chamber 8 through the passages 10, the counterbore being formed at the inner end of the hub, the lubricating chamber at its outer end, and the annular lubricating chamber occupying an intermediate position and itself arranged contiguous to the bore of the hub, as also the passages 10.

At the center of the chamber 8 is a hole 11 for the introduction of the lubricant; this location of the hole admitting of the chamber being filled with a sufficient quantity of oil to amply supply the annular chamber 9, through the passages 10, the said chamber not only serving the purpose of a reservoir but also to arrest the flow of oil along the axle 12 and prevent its waste. Between the annular chamber 9 and the counterbore 7 is a hardened steel bushing 13, against which bears a collar 14, formed on the axle and fitting within the counterbore 7. This bushing insures a neat fit around this portion of the axle journal, which is especially desirable not only from the fact that the cast metal is prevented from wearing and the life of the wheel thereby prolonged, but also a substantially oil-tight joint is for a long time maintained, preventing a leak, and a wabbling of the wheel.

At the inner face of the hub two spaced lugs 15 are cast integral therewith, between which is placed a latch 16 having an inwardly-projecting finger engaging over the collar 14, operating to keep this collar pressed to the bushing 13 and hold the axle against longitudinal movement. The latch 16 is retained in place by constructing it with a T-head 17, as shown in Fig. 3, engaging back of the lugs 15, and also by a cotter pin 18, passing through these lugs. The entire hub of the wheel, excepting the bushing 13, it will be observed, is made of a single piece, which presents a very simple construction and one in which the lubricant will be prevented from oozing out at joints, as in the case of a lubricating hub of a composite nature.

Having thus described our invention, we claim as new and desire to secure by Letters Patent:

A wheel hub having the inner end counterbored and the outer end formed with a lubricating chamber having a hole for the introduction of the lubricant, an annular lubricating chamber near the inner end of the hub contiguous to the bore thereof and connected with the first mentioned chamber by a passage also contiguous to said bore, and a hardened bushing wholly arranged in the bore of the hub between the annular chamber and the counterbore, said hub being otherwise formed as a single piece.

In testimony whereof we have signed our names to this specification in the presence of two subscribing witnesses.

JACOB S. STRAWN.
RODERICK W. DAVIES.

Witnesses:
  LEWIS L. FICHTHOON,
  CHESTER R. WILSON.